United States Patent
Hattori et al.

(10) Patent No.: US 7,494,731 B2
(45) Date of Patent: Feb. 24, 2009

(54) FUEL CELL POWER GENERATION SYSTEM

(75) Inventors: Nobuki Hattori, Nagoya (JP); Naomichi Akimoto, Nagoya (JP); Takeshi Masui, Okazaki (JP); Shigenori Onuma, Toyota (JP); Takashi Ishikawa, Toyota (JP)

(73) Assignees: Toyota Jidosha Kabushiki Kaisha, Toyota-shi (JP); Aisin Seiki Kabushiki Kaisha, Kariya-shi (JP)

( * ) Notice: Subject to any disclaimer, the term of this patent is extended or adjusted under 35 U.S.C. 154(b) by 25 days.

(21) Appl. No.: 10/326,140

(22) Filed: Dec. 23, 2002

(65) Prior Publication Data

US 2003/0138688 A1    Jul. 24, 2003

(30) Foreign Application Priority Data

Dec. 27, 2001 (JP) ............................. 2001-395986
Jan. 23, 2002 (JP) ............................. 2002-014186

(51) Int. Cl.
*H01M 8/04* (2006.01)
*H01M 8/06* (2006.01)

(52) U.S. Cl. ......................... 429/26; 429/19; 429/34
(58) Field of Classification Search ................... None
See application file for complete search history.

(56) References Cited

U.S. PATENT DOCUMENTS

| | | | | |
|---|---|---|---|---|
| 6,033,793 A | * | 3/2000 | Woods et al. | 429/17 |
| 6,562,502 B2 | * | 5/2003 | Haltiner, Jr. | 429/25 |
| 6,630,264 B2 | * | 10/2003 | Haltiner et al. | 429/32 |
| 6,942,942 B2 | * | 9/2005 | Haltiner et al. | 429/37 |
| 6,974,646 B2 | * | 12/2005 | Noetzel et al. | 429/34 |
| 7,037,613 B2 | * | 5/2006 | Haltiner et al. | 429/22 |

FOREIGN PATENT DOCUMENTS

| | | |
|---|---|---|
| JP | 58-119165 A | 7/1983 |
| JP | 01082464 A | 3/1989 |
| JP | 04-075263 A | 3/1992 |
| JP | 05021084 A | 1/1993 |
| JP | 05290868 A | 11/1993 |
| JP | A-9-022717 A | 1/1997 |

(Continued)

OTHER PUBLICATIONS

Japanese Language Version of Japanese Office Action, Appln. No. JP 2001-395986, issued Feb. 7, 2006.

(Continued)

*Primary Examiner*—John S Maples
(74) *Attorney, Agent, or Firm*—Kenyon & Kenyon LLP

(57) ABSTRACT

In a fuel cell power generation system that includes a fuel cell that generates power by an electrochemical reaction with a supply of a fuel gas and an oxide gas, a control portion that controls the amount of power generated by the fuel cell, and a hot portion that is hot while the system is operating, the control portion and the hot portion are disposed separated from one another in the same package. Accordingly, even though the control portion and the hot portion are housed within the same main package, the control portion is not easily effected by the hot portion while the system is operating because it is separated from the hot portion. As a result, the control portion is able to perform its function well.

15 Claims, 6 Drawing Sheets

FOREIGN PATENT DOCUMENTS

| | | | |
|---|---|---|---|
| JP | A-9-199152 | A | 7/1997 |
| JP | 2000012057 | | 1/2000 |
| JP | 2000208159 | A | 7/2000 |
| JP | 2001-185187 | A | 7/2001 |
| JP | 2001185187 | A | 7/2001 |

OTHER PUBLICATIONS

English Translation of Japanese Office Action, Appln. No. JP 2001-395986, issued Feb. 7, 2006.

Japanese Language Version of Japanese Office Action for Appln. No. 2002-014186 issued Jan. 16, 2007.

English Translation of Japanese Office Action for Appln. No. 2002-014186 issued Jan. 16, 2007.

Japanese Language Version of Japanese Office Action Appln. No. JP2001-395986 issued on Sep. 11, 2007.

English Language Translation of Japanese Office Action Appln. No. JP2001-395986 issued on Sep. 11, 2007.

Development commissioned by the New Energy and Industrial Technology Development Organization, Report on Achievement in 1999 *Research and development of proton-exchange membrane fuel cell; Development of power generation system technology; Development of high-voltage type, tens of kilowatt-level, dispersed power source system*, Mar. 2000, Toshiba Corporation, 11 pages & partial translation.

Battery Handbook, 3$^{rd}$ edition, Feb. 20, 2001, p. 569, Maruzen Co., Ltd. and partial English translation.

\* cited by examiner

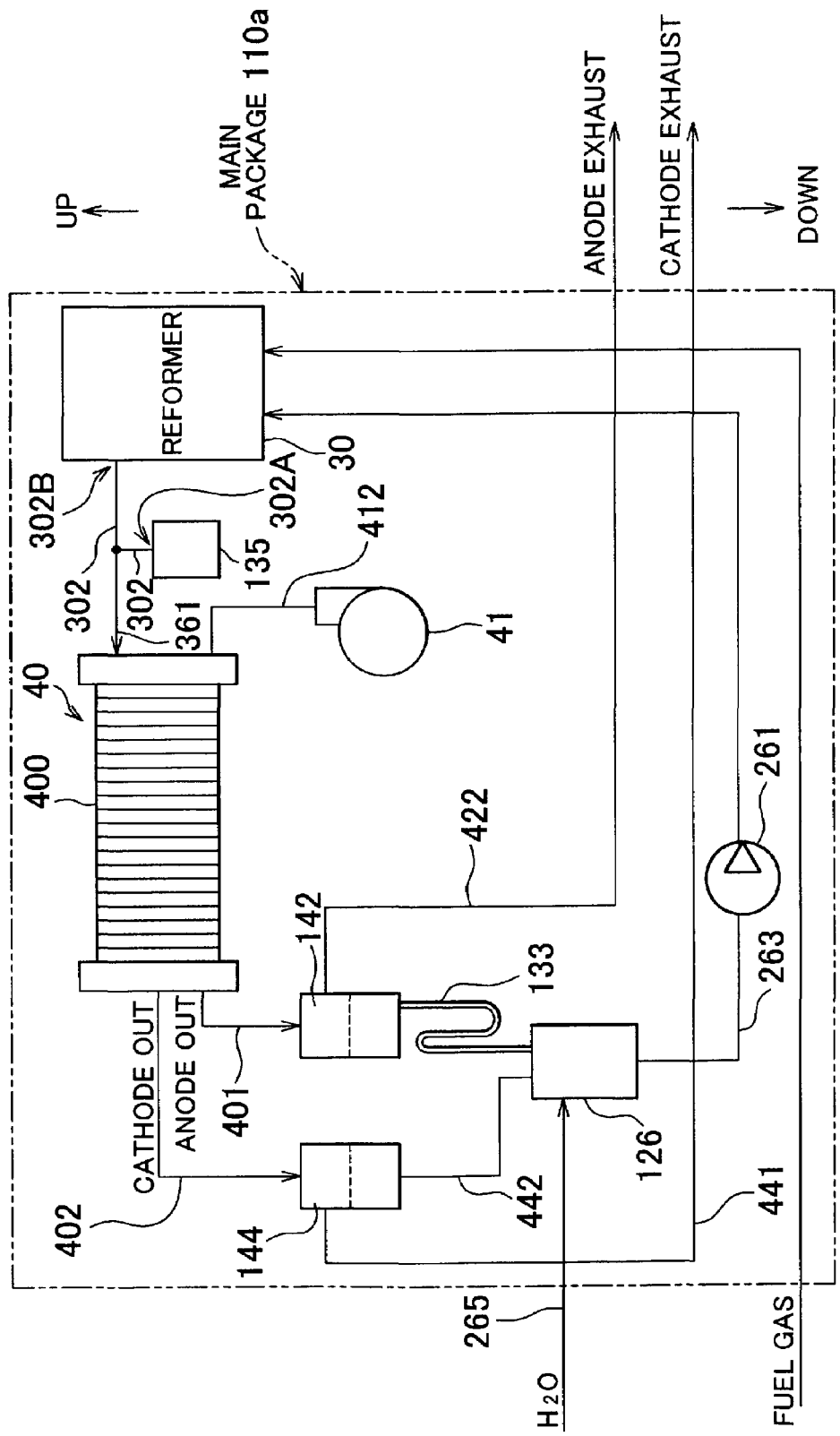

FUEL CELL POWER GENERATION SYSTEM

INCORPORATION BY REFERENCE

The disclosure of Japanese Patent applications No. 2001-395986 filed on Dec. 27, 2001 and No. 2002-014186 filed on Jan. 23, 2002, including the specification, drawings and abstract is incorporated herein by reference in its entirety.

BACKGROUND OF THE INVENTION

1. Field of the Invention

The invention relates to a fuel cell power generation system.

2. Description of Related Art

In recent years, a power generation system incorporating a fuel cell has been proposed as a cogeneration system in consideration of the environment. The fuel cell proposed to be incorporated is constructed of a stack of a plurality of single cells. One of the single cells includes an electrolyte membrane, an anode and a cathode which sandwich this electrolyte membrane, and a separator which both supplies a fuel gas to the anode and supplies an oxide gas to the cathode, and creates a separation wall between adjacent single cells. Moreover, hydrogen rich gas obtained by reacting a hydrocarbon fuel and water in a fuel gas generator heated by a burner or the like has been known to be used as the fuel gas.

Further, water vapor (or steam) is produced as a byproduct when power is generated by the fuel cell. When this water vapor cools, it becomes supersaturated and condenses such that it exists as water in a liquid phase. As a result, this water may block the supply paths and the discharge paths of the fuel gas and the oxide gas and the like, thereby reducing power generation efficiency.

Of this type of system, a fuel cell power generation system has also been known that houses various elements such as a fuel cell and a fuel gas generator inside a single package. For example, Japanese Patent Application Laid-Open Publication No. 9-199152 discloses a fuel cell power generation system in which one package is divided into a fuel chamber, a motor chamber, and a power source chamber. In this fuel chamber, various elements such as a fuel cell, heat exchangers, and a hydrogen generating apparatus that generates hydrogen as a fuel gas are all housed in the fuel chamber.

In the aforementioned Japanese Patent Application Laid-Open Publication No. 9-199152, however, the particular way in which the various elements such as the hydrogen generating device, the fuel cell, and the various heat exchangers are laid out is not considered. More specifically, it is difficult to have the various elements perform their functions well when using a compact package.

Further, Japanese Patent Application Laid-Open Publication No. 9-22717 discloses a fuel cell power generation system in which a moisture removal device is provided to remove the water in a liquid phase.

Also, hydrogen is used as the fuel gas for the fuel cell, and a reformer is used as the fuel gas generator in order to produce this hydrogen. With the construction disclosed in Japanese Patent Application Laid-Open Publication No. 9-22717, there is a possibility that condensed water from the reformer may enter the fuel cell stack when the reformer is connected.

SUMMARY OF THE INVENTION

In view of the foregoing problems, it is one object of the invention to provide a fuel cell power generation system in a compact package and still enable the elements of the system to perform their functions well. It is a further object of the invention to provide a fuel cell power generation system in which the reaction gas path is able to be kept from being blocked by condensed water.

In order to achieve at least one of the foregoing objects, the invention provides a fuel cell power generation system having the following construction.

That is, according to the invention, a fuel cell power generation system is provided which includes a fuel cell that generates power by an electrochemical reaction between a fuel gas and an oxide gas, a control portion that controls the amount of power generated by the fuel cell, and a hot portion that is hot while the system is operating. In this system, the control portion and the hot portion are disposed separated from one another within the same package.

In a fuel cell power generation system having this kind of construction, because the control portion, which is one of the elements of the system, is positioned separated from the hot portion, it is not easily effected by the hot portion during operation of the system and does not easily get hot. As a result, with this fuel cell power generation system, the control portion is able to perform its function well.

According to a further aspect of the invention, a fuel cell power generation system is provided which has a fuel cell that generates power by an electrochemical reaction between a fuel gas and an oxide gas, a control portion that controls the amount of power generated by the fuel cell, and a gas discharge portion that discharges exhaust gas generated while the system is operating. In this system, the control portion and the gas discharge portion are housed in the same package, and the control portion is disposed on a different surface than the surface on which the gas discharge portion is disposed in the package.

According to this fuel cell power generation system, because the controller, which is one of the elements of the system, is disposed on a different surface than the surface on which the gas discharge portion is disposed in the package, it is not easily effected by the exhaust gas and is therefore able to perform its function well.

Also, in order to achieve at least one of the objects described above, the invention provides a fuel cell power generation system having the following construction.

That is, according to the invention, a fuel cell power generation system is provided in which the fuel cell includes a fuel cell cell that generates power with a supply of a fuel gas and an oxide gas. This system also has a reformer that reforms the fuel gas disposed in the supply path of the fuel gas, below the fuel cell cell.

According to this fuel cell power generation system, because the reformer is disposed below the fuel cell cell, it is possible to restrict condensed water from the reformer from entering the fuel cell cell. As a result, it is possible to keep the fuel gas path from becoming blocked off.

According to a further aspect of the invention, a fuel cell power generation system is provided in which the fuel cell includes a fuel cell cell that generates power with a supply of a fuel gas and an oxide gas. This system also has a condenser provided in a path of at least one of the fuel gas and the oxide gas below the fuel cell cell. This condenser removes water vapor contained in at least one of the fuel gas and the oxide gas.

According to this fuel cell power generation system, because the condenser that removes water vapor contained in at least one of the fuel gas and the oxide gas is disposed below the fuel cell cell, it is possible to restrict condensed water from the condenser from entering the fuel cell cell.

BRIEF DESCRIPTION OF THE DRAWINGS

The above mentioned and other objects, features, advantages, technical and industrial significance of this invention will be better understood by reading the following detailed description of preferred embodiments of the invention, when considered in connection with the accompanying drawings, in which:

FIG. 6 is a block diagram illustrating the schematic construction and showing the vertical positional relationship of the elements in the fuel cell power generation system according to a third exemplary embodiment of the invention.

DESCRIPTION OF THE EXEMPLARY EMBODIMENTS

In the following description and the accompanying drawings, the present invention will be described in more detail with reference to exemplary embodiments.

First Embodiment

Figure 1:
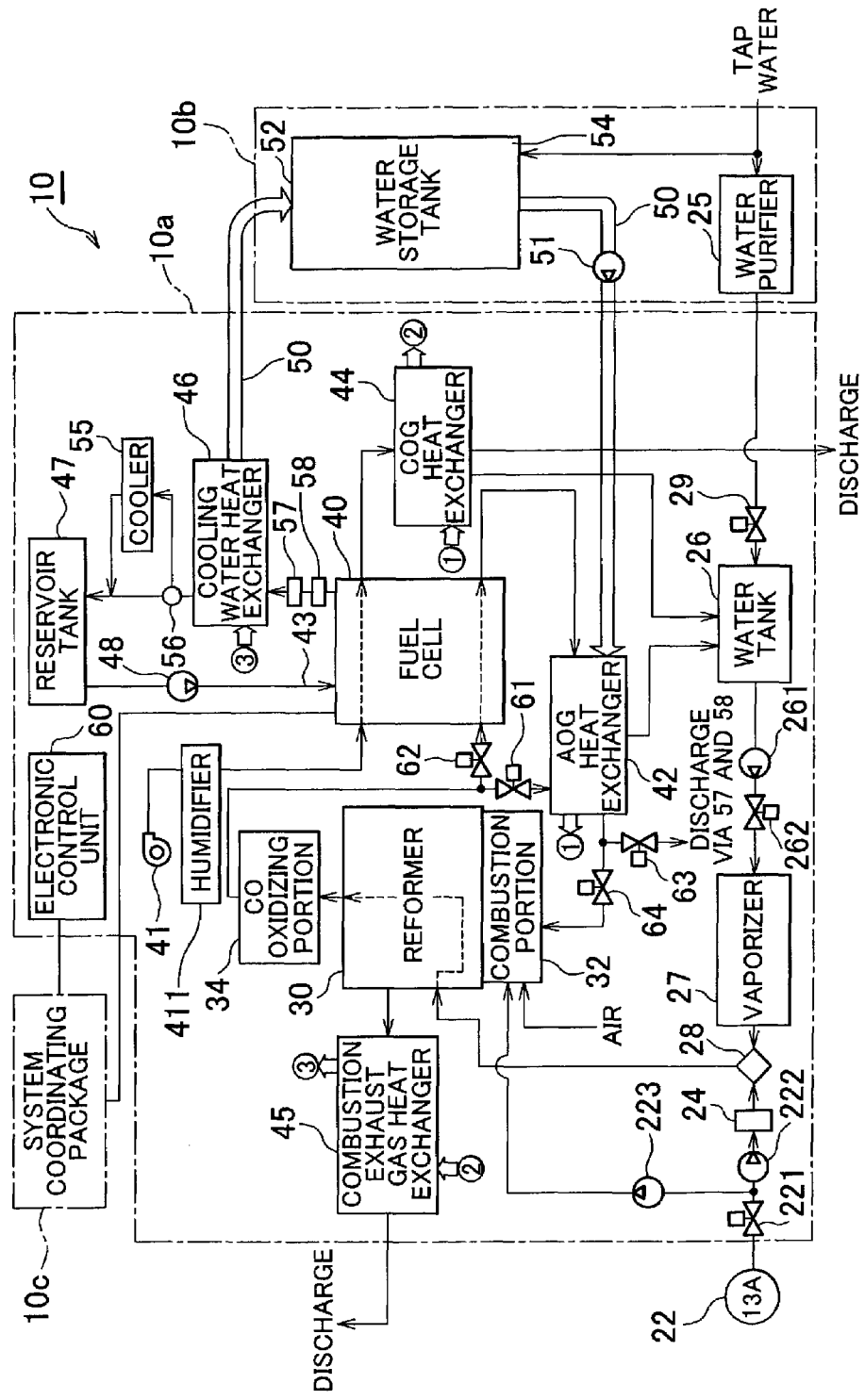
FIG. 1 is a block diagram schematically showing the structure of a fuel cell power generation system according to a first exemplary embodiment of the invention.
Figure 2:
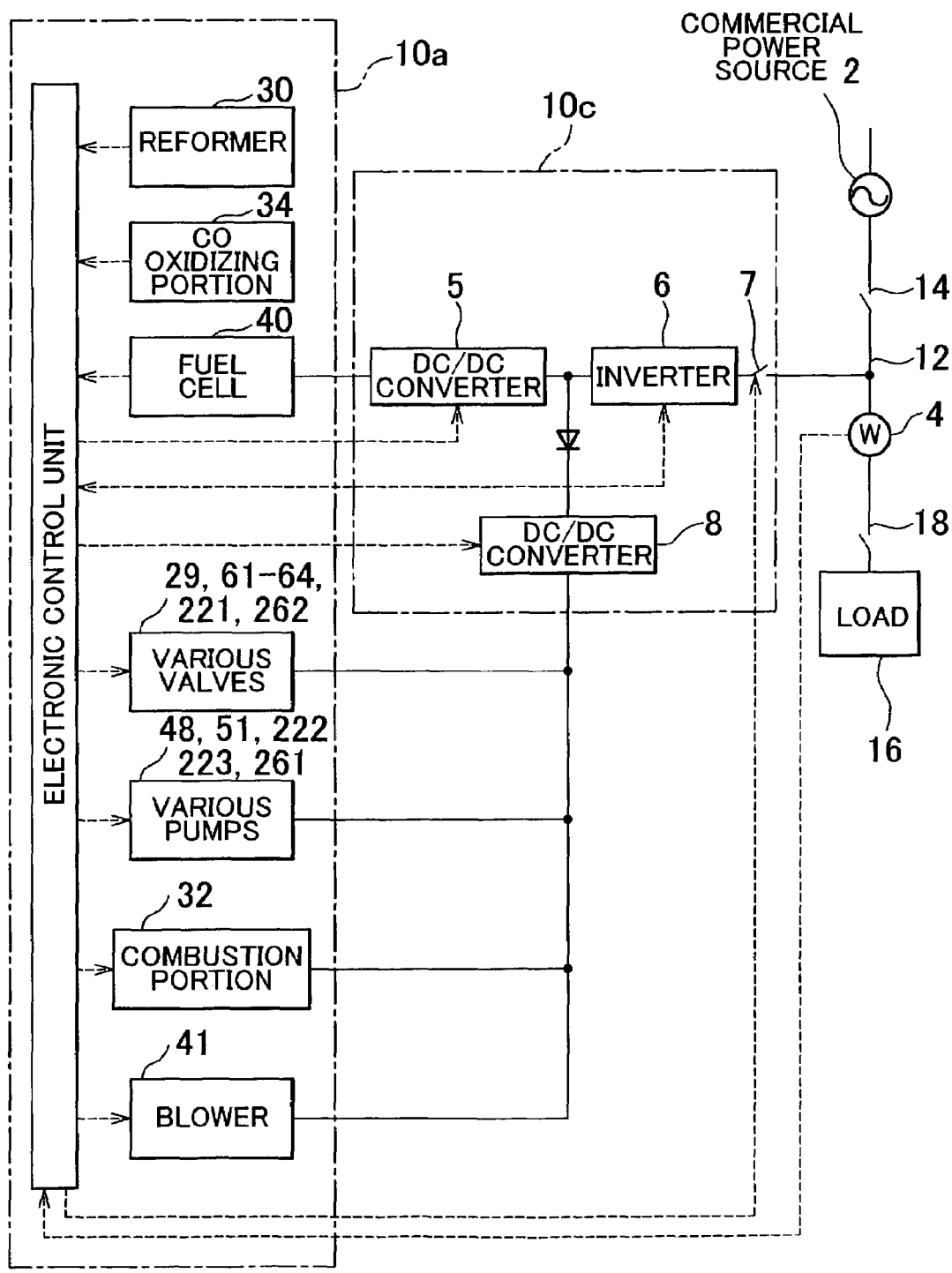
FIG. 2 is a block diagram showing signal inputs and outputs of an electronic control unit of the fuel cell power generation system according to the first exemplary embodiment of the invention.

First, a first exemplary embodiment of the invention will be described with reference to the drawings. FIG. 1 is a block diagram schematically showing the structure of a fuel cell power generation system 10 according to the first exemplary embodiment of the invention. FIG. 2 is a block diagram showing signal inputs and outputs of an electronic control unit 60 of the fuel cell power generation system 10.

Referring to FIG. 1, the fuel cell power generation system 10 mainly includes a reformer 30 that reforms city gas into hydrogen rich reformate gas, a CO oxidizing portion 34 that reduces the carbon monoxide in the reformate gas so as to make it a fuel gas, a mixer 28 that mixes the city gas and vapor at an appropriate ratio and supplies the mixture to the reformer 30, a water tank 26 (also referred to as a "water recovery tank") that serves as a supply source for the vapor to be supplied to the mixer 28, a fuel cell 40 that generates power by an electrochemical reaction between the fuel gas and the oxide gas, and heat exchangers 42, 44, 45, and 46 that are provided in a circulation path 50 that circulates water or hot water as a heat exchange medium 54 that does not need to be changed and which is stored in a water storage tank 52. In FIG. 1, the white, outlined arrows denote the flow of the heat exchange medium 54 through the circulation path 50, and are such that encircled numeral 1 is connected to encircled numeral 1, encircled numeral 2 is connected to encircled numeral 2, and encircled numeral 3 is connected to encircled numeral 3. Referring to FIG. 2, the fuel cell power generation system 10 also includes a DC/DC converter 5, an inverter 6, a DC/DC converter 8, a load power meter 4, and the electronic control unit 60. The DC/DC converter 5 regulates the voltage and current of direct current power (hereinafter referred to as "DC power") from the fuel cell 40 and converts it to the desired DC power. The inverter 6 converts the converted DC power into an alternating current power (hereinafter referred to as "AC power") of the same phase as a commercial power source 2, which the inverter 6 then supplies via a breaker 7 to a power line 12 that supplies power from the commercial power source 2 to a load 16. The DC/DC converter 8 functions as an auxiliary power source and lowers part of the DC power of which the voltage or current has been regulated. The load power meter 4 detects a load power consumed by the load 16, and the electronic control unit 60 serves as a control portion that controls the entire system.

The reformer 30 produces hydrogen rich reformate gas by subjecting the mixture of the city gas and vapor introduced from the mixer 28 to a steam reforming reaction and a shift reaction of Equation (1) and Equation (2), to be described later. A combustion portion 32 that supplies the heat necessary for the reaction is provided in the reformer 30. Pipes are provided such that the city gas is supplied from a gas pipe 22 to the combustion portion 32 via a valve 221 and a pressure increase pump 223, and air necessary for combustion is also supplied to the combustion portion 32. Further, a pipe is provided such that anode gas which has passed through the anode off gas heat exchanger 42 is also supplied to the combustion portion 32. That is, in order to efficiently use the anode off gas, unreacted hydrogen in the anode off gas is able to be used as fuel for the combustion portion 32. In this first exemplary embodiment, a burner is used as the combustion portion 32. The internal temperature of the reformer 30, including the combustion portion 32, while the system is operating reaches several hundred degrees Celsius (approximately 600 to 700° C.).

$$CH_4 + H_2O \rightarrow CO + 3H_2 \tag{1}$$

$$CO + H_2O \rightarrow CO_2 + H_2 \tag{2}$$

The CO oxidizing portion 34 selectively oxidizes the carbon monoxide in the reformate gas, making it into a hydrogen rich fuel gas having an extremely low concentration (approximately several ppm in this first exemplary embodiment) of carbon monoxide. The CO oxidizing portion 34 does this with a carbon monoxide oxidizing catalyst (e.g., a catalyst of an alloy such as platinum and rhuthenium) that selectively oxidizes the carbon monoxide that exists together with the hydrogen in the reformate gas with a supply of air via a pipe, not shown. The internal temperature of the CO oxidizing portion 34 while the system is operating reaches several hundred degrees Celsius.

The mixer 28 mixes at an appropriate ratio the city gas from which the sulfur content has been removed by the desulfurizer 24 after it has passed from the gas pipe 22 through the valve 221 and the pressure increase pump 222, and the vapor generated by the vaporizer 27 by vaporizing the water from the water tank 26. This mixer 28 then supplies this mixture to the reformer 30.

The water tank 26 is connected to the vaporizer 27 by a pipe in which a metering pump 261 and a valve 262 are disposed. The water stored in the water tank 26 is provided to the vaporizer 27 by driving the metering pump 261. Pipes are also provided leading to the water tank 26 from a water purifier 25 that cleans and purifies tap water so as to supply the water tank 26 with purified water, as well as from the heat exchangers 42 and 44 so as to supply the water tank 26 with condensed water. The internal temperature of the water tank 26 while the system is operating is several tens of degrees Celsius (approximately 50° C. or less).

Figure 3:
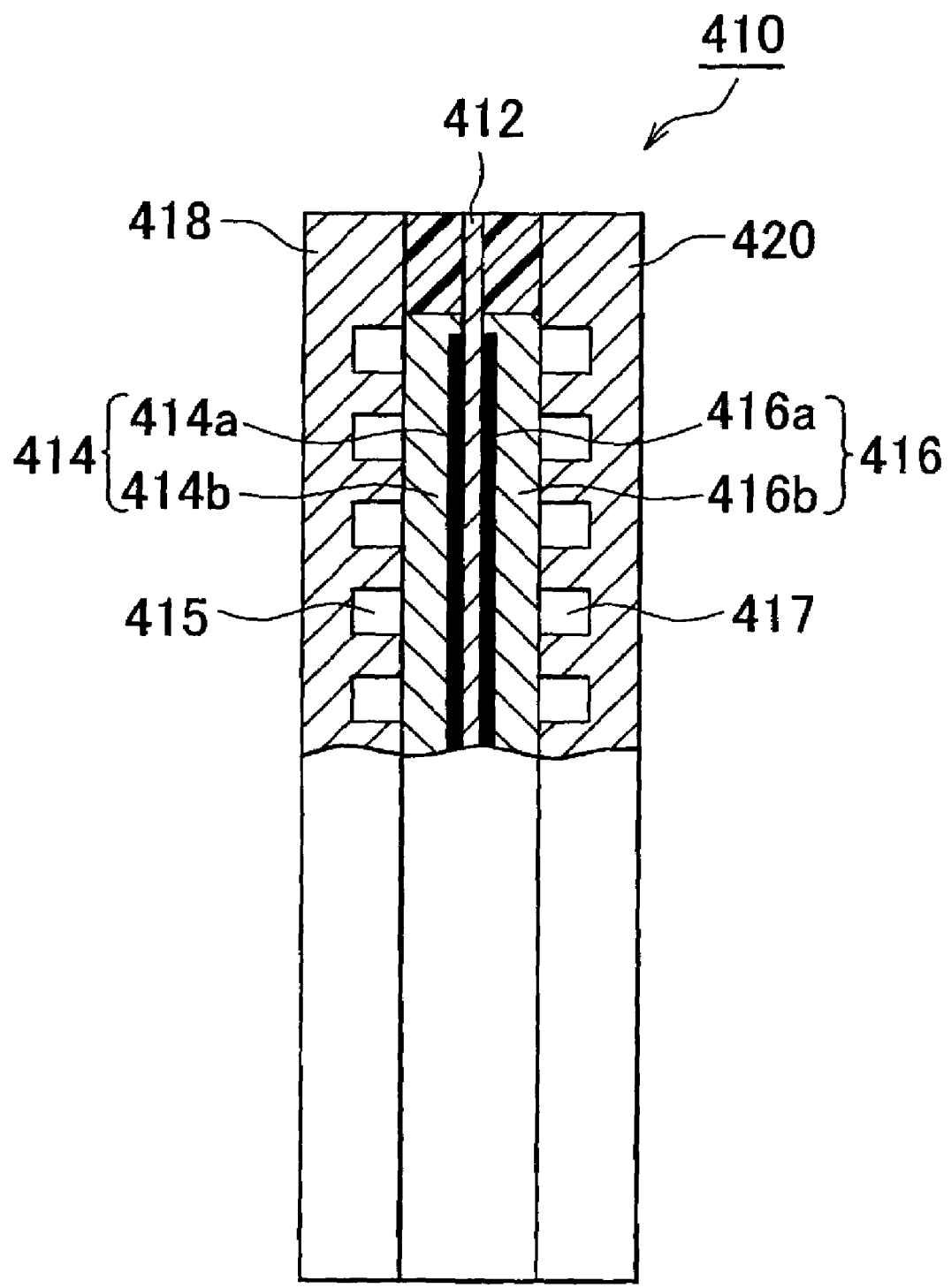
FIG. 3 is a sectional view of a single cell included in a fuel cell according to the first exemplary embodiment and a second exemplary embodiment of the invention.

The fuel cell 40 is structured as a polymer electrolyte membrane fuel cell made up of a stack of a plurality of single cells 410 (see FIG. 3). As shown in FIG. 3, each single cell 410 is constructed of an electrolyte membrane 412, an anode 414 and a cathode 416 which sandwich the electrolyte membrane 412, a separator 418 that has a fuel gas supply path 415 which supplies the fuel gas to the anode 414, and a separator 420 that has an oxide gas supply path 417 which supplies the oxide gas to the cathode 416. The separators 418 and 420 make up separation walls between adjacent single cells 410. Also, the anode 414 includes a catalyst electrode 414a and a gas diffusion electrode 414b. The cathode 416 includes a catalyst electrode 416a and a gas diffusion electrode 416b. The fuel gas is supplied from the CO oxidizing portion 34 to the anode 414 of each single cell 410 and air as the oxide gas is supplied from the blower 41 to the cathode 416 of each single cell 410 via a humidifier 411. Power is then generated by an electrochemical reaction between the hydrogen in the fuel gas and the oxygen in the oxide gas.

The circulation path 50 is a circulation path that leads the heat exchange medium 54 stored in the water storage tank 52 from the water storage tank 52 to the anode off gas heat exchanger 42, the cathode off gas heat exchanger 44, the combustion exhaust gas heat exchanger 45, and the cooling water heat exchanger 46, in that order, and then back to the water storage tank 52 again. A circulation pump 51 is provided midway in the circulation path 50, which circulates the heat exchange medium 54 from the water storage tank 52 through the circulation path 50. Further, the hot water which serves as the heat exchange medium 54 stored in the water storage tank 52 is supplied to a predetermined location through a hot water supply path, not shown. After the hot water has been supplied, tap water is then added to the water storage tank 52 to make it full.

When the system starts up (i.e., immediately after the start of operation), the electronic control unit 60 opens the valve 61 and the valve 63 and closes the valve 62 and the valve 64 such that the anode off gas heat exchanger 42 performs heat exchange between the initial fuel gas sent in from the CO oxidizing portion 34 and the heat exchange medium 54 passing through the circulation path 50. In the anode off gas heat exchanger 42, the heat exchange medium 54 recovers heat by removing the latent heat of condensation from the initial fuel gas. Because the fuel gas has been stripped of its latent heat of condensation, the moisture condenses such that the fuel gas has a low moisture content. Therefore, because the anode off gas heat exchanger 42 also functions as a condenser, it may also be referred to as the condenser 42. Further, the anode off gas heat exchanger 42 supplies the fuel gas after heat exchange to an initial off gas combustor 57 (the gas flow from the anode gas heat exchanger 42 to the initial off gas combustor 57 is omitted in FIG. 1), where it is catalytically combusted and then discharged outside from a first gas discharge outlet 49 (see FIG. 4) via an initial off gas heat exchanger 58. The initial off gas heat exchanger 58 and the initial off gas combustor 57 are incorporated into a cooling water circulation path 43. After having passed though the fuel cell 40, the cooling water cools the initial off gas heat exchanger 58 and the initial off gas combustor 57 as it passes through them in that order.

Meanwhile, during normal operation, the electronic control unit 60 closes the valve 61 and the valve 63 and opens the valve 62 and the valve 64 such that the anode off gas heat exchanger 42 performs heat exchange between the anode off gas discharged from the CO oxidizing portion 34 via the anode 414 of the fuel cell 40 and the heat exchange medium 54 passing through the circulation path 50. In the anode off gas heat exchanger 42, the heat exchange medium 54 recovers heat by removing the latent heat of condensation from the anode off gas. Because the anode off gas has been stripped of its latent heat of condensation, the moisture condenses such that the anode off gas has a low moisture content. Therefore, as described above, the anode off gas heat exchanger 42 also functions as a condenser. Further, the anode off gas heat exchanger 42 supplies the anode off gas after heat exchange to the combustion portion 32, and supplies the condensed water obtained from the condensed moisture in the anode off gas to the water tank 26. The internal temperature of the anode off gas heat exchanger 42 while the system is operating is several tens of degrees Celsius (approximately 50 to 80° C.).

The heat exchanger 44 performs heat exchange between the cathode off gas discharged from the cathode 416 of the fuel cell 40 and the heat exchange medium 54 passing through the circulation path 50. In the cathode off gas heat exchanger 44, the heat exchange medium 54 recovers heat by removing the latent heat of condensation from the cathode off gas. Because the cathode off gas has been stripped of its latent heat of condensation, the moisture condenses. Therefore, because the heat exchanger 44 also functions as a condenser, it may also be referred to as the condenser 44. Further, the cathode off gas heat exchanger 44 discharges the cathode off gas after heat exchange into the atmosphere from the first gas discharge outlet 49 (see FIG. 4), and supplies the condensed water obtained from the condensed moisture in the cathode off gas to the water tank 26. The internal temperature of the cathode off gas heat exchanger 44 while the system is operating is several tens of degrees Celsius (approximately 50 to 80° C.).

The heat exchanger 45 performs heat exchange between the combustion exhaust gas generated by the combustion portion 32 and the heat exchange medium 54 passing through the circulation path 50. In the combustion exhaust gas heat exchanger 45, the heat exchange medium 54 recovers heat by removing it from the combustion exhaust gas. The combustion exhaust gas is gas that results from city gas, or anode off gas which has passed through the anode off gas heat exchanger 42, combusting with oxygen in the air. This gas is then discharged through a second gas discharge outlet 59 (see FIG. 4) after passing through a jacket, not shown, that surrounds the reformer 30.

The cooling water heat exchanger 46 is provided midway in the cooling water circulation path 43. Here, the cooling water circulation path 43 is a circulation path that leads, via a circulation pump 48, the cooling water stored in the reservoir tank 47 from the reservoir tank 47 through a cooling water through-path, not shown, of the fuel cell 40 to the initial off gas heat exchanger 58, through a cooling water through-path, not shown, of the initial off gas combustor 57 to the cooling water heat exchanger 46, in that order, and back again to the reservoir tank 47. However, a bypass path that includes a cooler 55, which forcibly cools the cooling water using a fan, is provided between the cooling water heat exchanger 46 and the reservoir tank 47 in the cooling water circulation path 43. When the temperature of the cooling water does not exceed a preset temperature, a thermostat 56 provided at the point where the bypass path branches off does not activate, so that the cooling water is led directly to the reservoir tank 47 from the cooling water heat exchanger 46. On the other hand, if the temperature of the cooling water exceeds the preset temperature, the thermostat 56 activates and the cooling water is first led along the bypass path to the cooler 55 where it is forcibly cooled, and then on to the reservoir tank 47. The cooling water heat exchanger 46 performs heat exchange between the cooling water after passing through the initial off gas heat exchanger 58 and the initial off gas combustor 57 (the cooling water has become hot from cooling those portions) and the heat exchange medium 54 passing through the circulation path 50. The electrochemical reaction in the fuel cell 40 is an exothermic reaction, but by circulating the cooling water in this way, the fuel cell 40 is able to be maintained at an appropriate temperature (80 to 90° C. in this first exemplary embodiment). The internal temperature of the cooling water heat exchanger 46 while the system is operating is several tens of degrees Celsius (approximately 50 to 80° C.).

As shown in FIG. 2, an output terminal of the fuel cell 40 is connected via the DC/DC converter 5, the inverter 6, and the breaker 7 to a power line 12 which extends from the commercial power source 2 to the load 16. The DC power from the fuel cell 40 is converted to AC power of the same phase as the commercial power source 2 and is added to the AC power from the commercial power source 2 so as to be able to be supplied to the load 16. The DC/DC converter 5 is constructed as a typical DC/DC converter circuit and the inverter 6 is constructed as a typical inverter circuit so detailed descriptions thereof shall be omitted. Further, the DC/DC converter 8 is connected to the power line that branches off from the output side of the DC/DC converter 5. This DC/DC converter 8 functions as a DC power source that supplies DC power to auxiliary machines such as solenoids for various valves 29, 61 through 64, 221, and 262, various pumps 48, 51, 222, 223, and 261, and a blower 41, and the like. The load 16 is connected to the power line 12 via a breaker 18.

The electronic control unit 60 is constructed as a microprocessor that includes a CPU, ROM, and RAM and the like, which are known. Into this electronic control unit 60 are input an output current and voltage from a current sensor and a voltage sensor, both not shown, in the inverter 6, a load power from the load power meter 4, and various temperatures from temperature sensors, not shown, mounted to the reformer 30, the CO oxidizing portion 34, and the fuel cell 40, and the like. Various signals are also output from the electronic control unit 60. Such signals include driving signals to the solenoids of the various valves 29, 61 through 64, 221, and 262, driving signals to the various pumps 48, 51, 222, 223, and 261, a driving signal to the blower 41, an ignition signal to the combustion portion 32, control signals to the DC/DC converter 5 and the DC/DC converter 8, a switching control signal to the inverter 6, and a driving signal to the breaker 7, and the like.

When any one of a high, middle, and low operation mode is determined according to the load power detected by the load power meter 4, the electronic control unit 60 makes the power set according to that operation mode a target output power and controls the amount of power generated by the fuel cell 40, as well as controls the DC/DC converter 5 and the inverter 6, such that the DC power from the fuel cell 40 is converted by the inverter 6 into AC power to be supplied to the power line 12 that is equal to that target output power. In this case, control of the amount of power generated by the fuel cell 40 refers to control of the supply of the fuel gas to the fuel cell 40 by controlling, for example, the valve 221 and the pressure increase pump 222 of the city gas, or the metering pump 261 and the valve 262 of the water tank 26, and also to control of the supply of oxide gas by controlling the blower 41.

Next, the package structure of the fuel cell power generation system 10 described above will be described. As shown in FIGS. 1 and 2, the fuel cell power generation system 10 is provided with a main package 10a, a water storing package 10b, and a system coordinating package 10c, which all house various system components inside each of their individual cases. That is, the main package 10a mainly houses the reformer 30, the CO oxidizing portion 34, the water tank 26, the fuel cell 40, the blower 41, the anode off gas heat exchanger 42, the cathode off gas heat exchanger 44, the combustion exhaust gas heat exchanger 45, the cooling water heat exchanger 46, and reservoir tank 47, and the electronic control unit 60, and the like. The water storage package 10b mainly houses the water purifier 25 and the water storage tank 52 and the like, and the system coordinating package 10c mainly houses the DC/DC converters 5 and 8, and the inverter 6, and the like.

Figure 4:
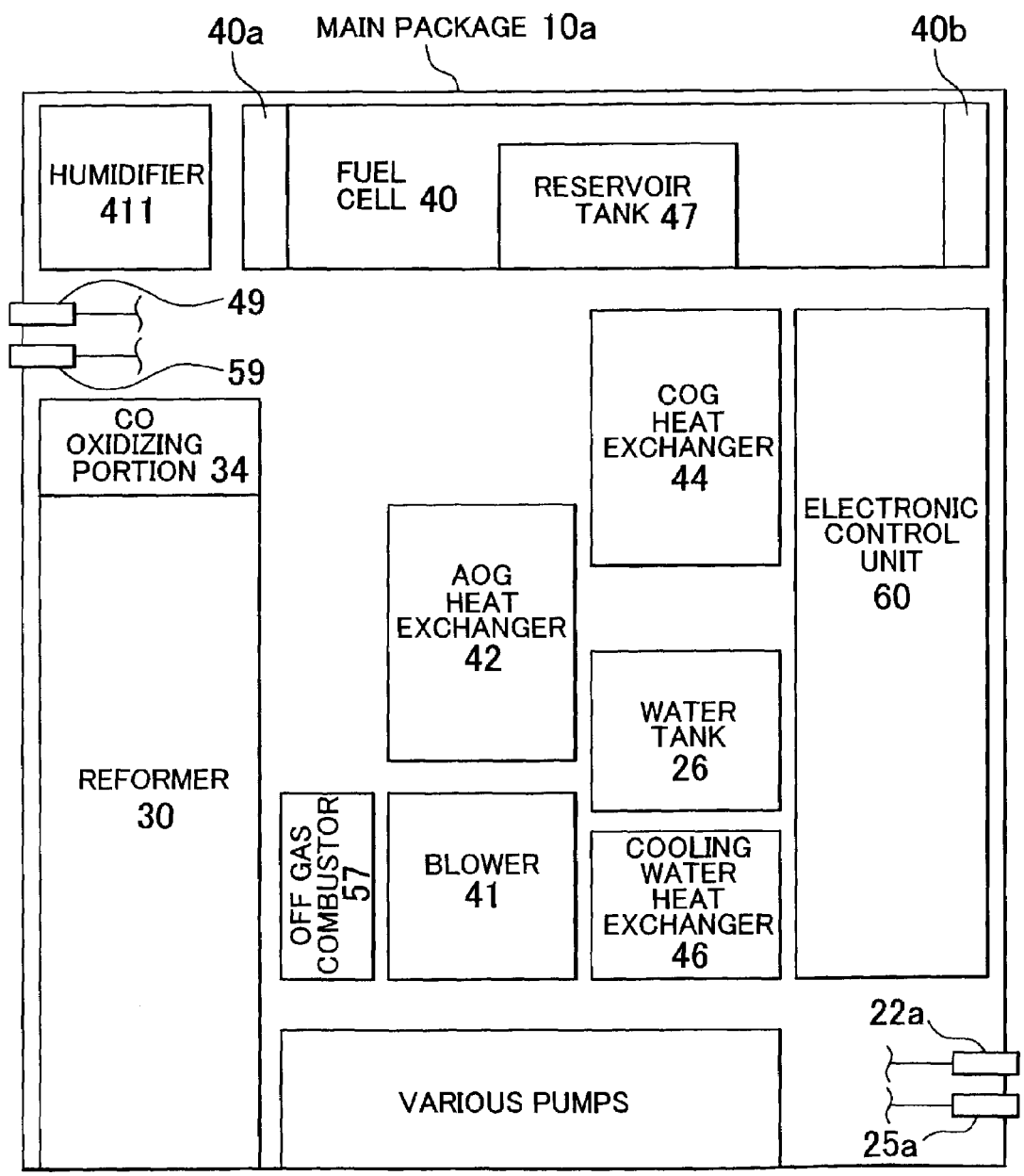
FIG. 4 is a front view for illustrating the layout of the main components housed in a main package in the fuel cell power generation system according to the first exemplary embodiment of the invention.

Now, the main package 10a will be described in further detail with reference to FIG. 4. FIG. 4 is an explanatory view showing the layout of the main components housed in the main package 10a. FIG. 4 is also a front view of the main package 10a when a closable or detachable front door, not shown, is open. When viewing the figure normally, left and right represent the width, top and bottom represent the height, and front and back (in the direction perpendicular to the paper on which the figure is shown) represent the depth of the main package 10a. The main package 10a according to the first exemplary embodiment has a rectangular solid shape having a width of 700 mm, a depth of 360 mm, and a height of 900 mm, so it is compact compared with conventional art.

The fuel cell 40, the reservoir tank 47, and the humidifier 411 are arranged at the very top in the main package 10a, with the reservoir tank 47 being in front of the fuel cell 40. The fuel cell 40 has a pipe connecting portion 40a for the pipes for the fuel gas, oxide gas, and cooling water on the left end wall, and a power output portion 40b that outputs power to the system coordinating package 10c on the right end wall. Further, in the main package 10a, the reformer 30 and the CO oxidizing portion 34 as the fuel gas generating portion, and the electronic control unit 60 as the control portion, are arranged in the space below the fuel cell 40 so that they are not adjacent to one another. More specifically, the reformer 30 and the CO oxidizing portion 34, which are hot while the system is operating, are arranged so that they are almost contacting the left side face of the main package 10a, and the electronic control unit 60 is arranged so that it is almost contacting the right side face of the main package 10a. Further, the initial off gas combustor 57, which is hot while the system is starting up, is arranged near the reformer 30. The electronic control unit 60 is arranged so that it is not adjacent to the initial off gas combustor 57. Hereinafter, the CO oxidizing portion 34, the reformer 30, and the initial off gas combustor 57 will be referred to as "hot portions".

Also, the anode off gas heat exchanger 42, the cathode off gas heat exchanger 44, the cooling water heat exchanger 46, and the water tank 26, which are at a relatively low temperatures while the system is operating, are provided between the hot portions and the electronic control unit 60. In particular, these are located near the electronic control unit 60. Also, the various pumps 48, 51, 222, 223, and 261 are arranged substantially in the center at the bottom in the main package 10a. The blower 41 is arranged above these pumps, and a city gas inlet 22a, which leads the city gas from the gas pipe 22 (see FIG. 1), and a purified water inlet 25a, which leads the purified water from the water purifier 25 in the water storage package 10b, are provided on the right side face of the main package 10a.

Further, the first gas discharge outlet 49 and the second gas discharge outlet 59, through which exhaust gas generated during operation of the system is discharged, are provided on the left side face which is opposite the right side face where the electronic control unit 60 is located. According to the first exemplary embodiment, the exhaust gas that has passed through the cathode off gas heat exchanger 44 while the system is operating is discharged outside through the first gas discharge outlet 49. Also, upon startup of the system, the exhaust gas generated during catalytic combustion in the initial off gas combustor 57 passes through the anode off gas heat exchanger 42 and is also discharged outside through the first gas discharge outlet 49 via the initial off gas heat exchanger 58. Meanwhile, during normal operation of the system, the combustion exhaust gas generated when the anode off gas supplied to the combustion portion 32 after passing through the anode off gas heat exchanger 42 is combusted in the combustion portion 32, is discharged outside through the second gas discharge outlet 59 via the combustion exhaust gas heat exchanger 45. Also, the combustion exhaust gas generated when the city gas supplied to the combustion portion 32 via the pressure increase pump 223 is combusted in the combustion portion 32, is also discharged outside through the second gas discharge outlet 59 via the combustion exhaust gas heat exchanger 45.

According to the fuel cell power generation system 10 according to the first exemplary embodiment as detailed above, although the electronic control unit 60 is housed in the same main package 10a as the hot portions (i.e., the reformer 30, the CO oxidizing portion 34, and the initial off gas combustor 57), because the electronic control unit 60 is positioned away from the hot portions, it is not easily affected by the hot portions while the system is operating, and therefore resists becoming hot itself. Accordingly, the electronic control unit 60 can perform its function well.

Further, because the electronic control unit 60 is shielded from heat by the relatively low temperature portions (i.e., the anode off gas heat exchanger 42, the cathode off gas heat exchanger 44, the cooling water heat exchanger 46, and the water tank 26) disposed between the electronic control unit 60 and the hot portions, the electronic control unit 60 resists becoming hot itself even when the main package 10a is compact as in the first exemplary embodiment. In particular, the heat anode off gas exchanger 42, the cathode off gas heat exchanger 44, the cooling water heat exchanger 46, and the water tank 26 are disposed near the electronic control unit 60, such that the electronic control unit 60 is even more effectively shielded from heat.

Moreover, the electronic control unit 60 is disposed in the main package 10a so that it almost contacts the right side face which is the side opposite the left side face where the first gas discharge outlet 49 and the second gas discharge outlet 59 are provided in the main package 10a. As a result, even if the main package 10a is made compact as in the first exemplary embodiment, the electronic control unit 60 is not easily affected by the exhaust gas, such that it is able to perform its function well.

Furthermore, according to the first exemplary embodiment, the fuel cell 40 is disposed above the hot portions. As a result, air warmed by the hot portions at times such during startup of the system tends to accumulate around the fuel cell 40, thus improving the ability of the electronic control unit 60 to warm up.

Also, the fuel cell 40 is provided with the pipe connecting portion 40a for the gas and cooling water pipes at one end and the power output portion 40b at the other end. As a result, it is possible to connect the pipes and output power in a relatively small space. As in the first exemplary embodiment, the main package 10a is suitable to be made compact. In particular, the power output portion 40b is disposed in a location where it can easily be exposed from the right side face of the main package 10a, which facilitates the work of connecting the system coordinating package 10c.

The invention is not limited in any way to the first exemplary embodiment. On the contrary, many modifications and variations are included within the technical scope of the invention.

For example, according to the foregoing exemplary embodiment, the initial off gas combustor 57 is constructed so as to perform combustion by a catalytic operation. Alternatively, however, the initial off gas combustor 57 may be constructed so as to perform combustion with a burner (i.e., by flame).

Also according to the first exemplary embodiment, the reservoir tank 47 is disposed in front of the fuel cell 40 in the main package 10a. Alternatively, however, the reservoir tank 47 may be placed in a position near the upper portion of the electronic control unit 60, and/or between the hot portions and the electronic control unit 60. This arrangement enables the electronic control unit 60 to be effectively shielded by the reservoir tank 47 from heat given off by the hot portions.

Further, the main package 10a employed in the above described exemplary embodiment is a rectangular parallelepiped case having a width of 700 mm, a depth of 360 mm, and a height of 900 mm. However, the size is not particularly limited to this. The case may also be a shape other than rectangular parallelepiped (e.g., it may be cylindrical), and further, the case may be even more compact.

Second Embodiment

Figure 5:
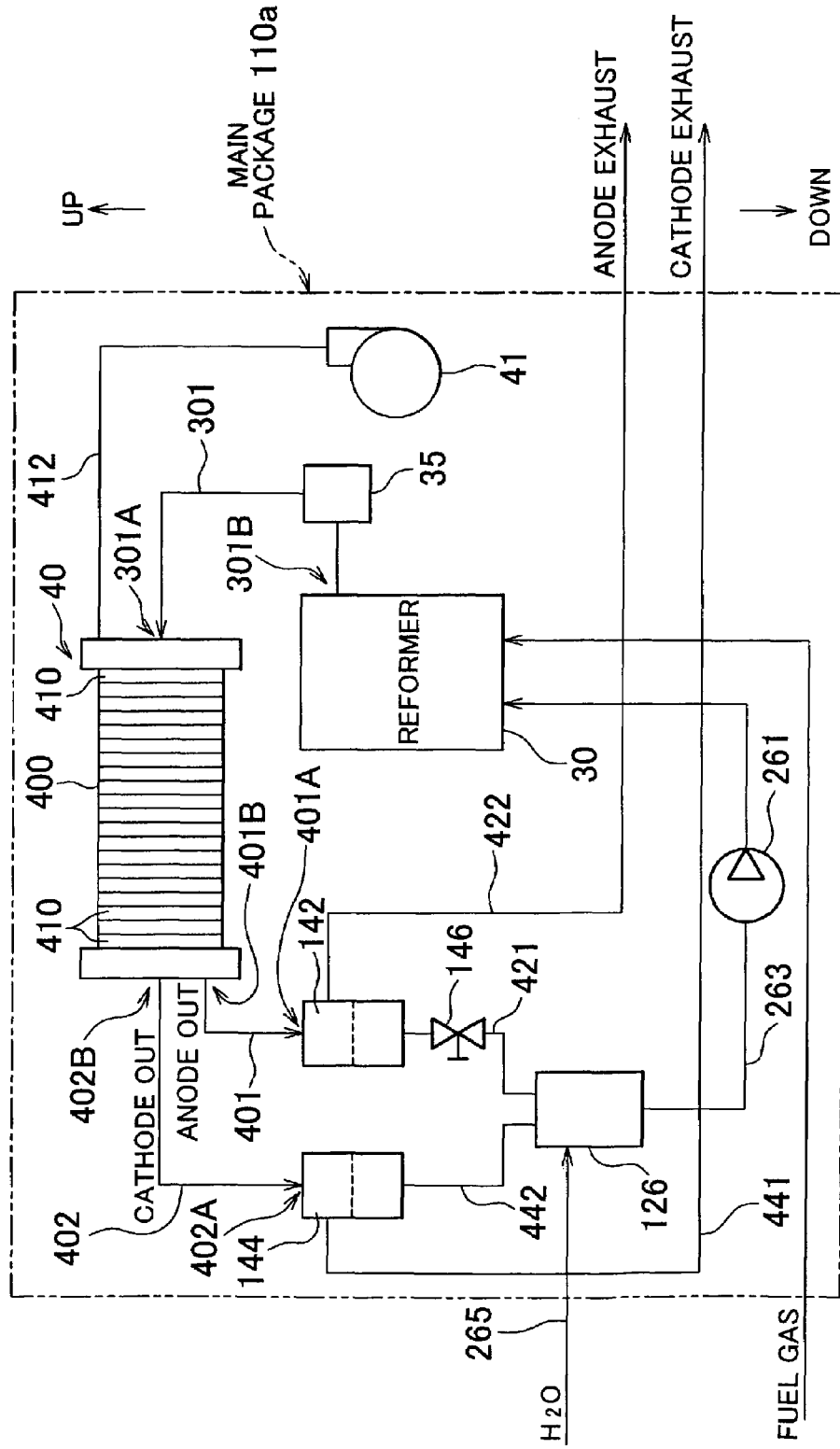
FIG. 5 is a block diagram illustrating the schematic construction and showing the vertical positional relationship of the elements in the fuel cell power generation system according to the second exemplary embodiment of the invention.

Next, a second exemplary embodiment according to the invention will be described with reference to FIG. 5. FIG. 5 is a view corresponding to the block diagram schematically showing the configuration of the fuel cell power generation system of the foregoing first exemplary embodiment. Further, FIG. 5 also shows the vertical positional relationship between the various elements of the system. Also, to facilitate understanding, only the elements relating to the aim of the second exemplary embodiment are shown in the figure. Like elements in the first and second exemplary embodiments shall be denoted by like reference numerals.

Referring to FIG. 5, a fuel cell power generation system 110 according to the second exemplary embodiment includes a fuel cell 40 made up of a stack 400 in which a multiplicity of fuel cell cells 410 are stacked together, a condenser 142 (equivalent to the anode off gas heat exchanger 42 in the first exemplary embodiment) and a condenser 144 (equivalent to the cathode off gas heat exchanger 44 in the first exemplary embodiment) that condense the moisture contained in fuel gas and oxide gas (hereinafter, "combustion gas" and "oxide gas" may, when appropriate, be generally referred to as "reaction gas"), respectively, discharged from the stack 400, a water recovery tank 126 (equivalent to the water tank 26 in the first exemplary embodiment) that stores the water in a liquid phase obtained by condensation, a reformer 30 that reforms the fuel gas, a metering pump 261 that sends water from the water recovery tank 126 to the reformer 30, and a blower 41 that sends outside air to the stack 400.

The single cell 410 is as shown in FIG. 3 of the first exemplary embodiment. The operation in which the single cell 410 generates power by an electrochemical reaction will now be described in further detail.

When the fuel gas is supplied to the anode 414 and the oxide gas is supplied to the cathode 416, a two-phase boundary face having a gas phase (i.e., a fuel gas or an oxide gas), a liquid layer (i.e., a polymer electrolyte), and a solid phase (i.e., a catalyst) forms at a boundary face of the catalyst electrodes 414a and 416a, formed on each electrode membrane, and the electrolyte membrane 412. DC current is then generated by an electrochemical reaction. That is, on the anode 414 side, H⁺ ions (protons) and a electrons (e⁻) are produced by decomposing the hydrogen as shown in Equation (3) below.

$$H_2 \rightarrow 2H^+ + 2e^- \tag{3}$$

Also, on the cathode 416 side, water vapor is produced by joining oxygen, hydrogen and electrons, as shown in Expression (4) below.

$$(1/2)O_2 + 2H^+ + 2e^- \rightarrow H_2O \tag{4}$$

As a result of this reaction, the H⁺ ions (protons) produced at the anode 414 move through the electrolyte membrane 412 toward the cathode 416, and the electrons (e⁻) move through the load device to the cathode 416. On the other hand, at the cathode 416, the oxygen contained in the oxide gas, the H⁺ ions that have moved through the electrolyte membrane 412 from the anode 414, and the electrons that have moved through the load device react with one another so as to produce $H_2O$ (water vapor).

In the separators 418 and 420, supply paths 415 and 417 are formed as a means by which to supply and discharge the reaction gas to the fuel cell cells 410. Through holes and ducts, not shown, are provided in the direction of thickness in the fuel cell cells 410 which make up the stack 400. These through holes and ducts enable the fuel gas to flow through the supply path 415 and the oxide gas to flow through the supply path 417. All of the fuel cell cells 410 are connected to one another juxtaposed with respect to the flow of the reaction gas. The fuel gas used in the reaction is discharged from a pipe 401 and the oxide gas used in the reaction is discharged from a pipe 402.

The condensers 142 and 144 include a container that stores the water in a liquid phase from the condensed water vapor in the reaction gas, and a water-cooled pipe, not shown, that protrudes into the container, and which cools the reaction gas inside the container by the circulation of the cooling water from outside. The pipe 401 from the stack 400 is connected to the condenser 142 and the pipe 402 is connected to the condenser 144. Outflow pipes 422 and 441, through which the reaction gas flows out, are connected to the condensers 142 and 144, respectively. After flowing through the pipes 401 and 402 and being discharged into the container, the reaction gas is cooled by the water-cooled pipe and the water in a liquid phase which has become supersaturated is stored in the container.

The water recovery tank 126 is a sealed container that stores the water in a liquid phase from the condensers 142 and 144, as well as the water supplied appropriately from the outside through a pipe 265. A manually closable valve 146 is disposed midway in a pipe 421 which connects the condenser 142 with the water recovery tank 126. A pipe 263, which is connected to the discharge side of the water recovery tank 126, is connected to the reformer 30. A metering pump 261 is disposed midway in the pipe 263.

The reformer 30 is connected to a desulfurizer, a reformer, a CO shift converter, and a CO oxidizer, all not shown, in this order, which is a known configuration. After the sulfur has been removed from the fuel gas in the desulfurizer, the fuel gas then reacts with methane and the water vapor in the reformer 30 under a heat of approximately 600 to 700° C. to produce hydrogen ($CH_4 + H_2O \rightarrow CO + 3H_2$, $CO + H_2O \rightarrow CO_2 + H_2$), as was illustrated by Equation (1) in the first exemplary embodiment. The carbon monoxide to be mixed with this hydrogen reacts with the water vapor in the CO shift converter, as was illustrated by Equation (2) in the first exemplary embodiment, to become a mixture of carbon dioxide and hydrogen ($CO + H_2O \rightarrow CO_2 + H_2$). Further, the carbon monoxide is reacts with oxygen in the CO oxidizer, such that carbon dioxide is produced ($CO + (1/2)O_2 \rightarrow CO_2$).

A moisture removal device 35 for trapping the condensed water is provided near the reformer 30 in the a pipe 301 that connects the reformer 30 and the stack 400. The moisture removal device 35 is constructed of a sealed container that stores water in a liquid phase. The pipe 301 connected to the upper end of the moisture removal device 35 is connected to the stack 400, and the pipe 301 connected to the side end of the moisture removal device 35 is connected to the reformer 30. After flowing through the pipe 301 from the reformer 30 and being discharged into the container, the fuel gas is cooled by the side wall of the container, or the like, and the water in a liquid phase which has become supersaturated is stored in the container. Further, the fuel gas flowing through the pipe 301 from the moisture removal device 35 toward the stack 400 is cooled by the walls of the pipe 301, and the water in a liquid phase which has become supersaturated runs downward through the pipe 301 and is stored in the container.

The reformer 30 is disposed below the stack 400. That is, the reformer 30 is disposed such that the upper most fuel gas level therein is always at a lower height in the gravitational direction than the bottom surface of the inside of the stack 400. Also, the pipe 301 which connects the reformer 30 and the stack 400 is disposed so as to always be an upward path from the reformer 30 to the stack 400. That is, the pipe 301 is disposed such that, of two arbitrary points having different phases in the longitudinal direction (in particular, two arbitrary points located on a bottom portion of the pipe 301), the point on the side close to a terminating end 301A is always on the upper side, or positioned at substantially the same height in the gravitational direction as, the point on the side close to a starting end 301B.

The moisture removal device 35 also disposed below the stack 400. That is, the moisture removal device 35 is disposed such that the upper end of the inner surface of that container is always at a lower height in the gravitational direction than the bottom surface of the inside of the stack 400. Further, at least the portion of the pipe 301 that connects the moisture removal device 35 to the stack 400 is disposed so as to always be an upward path from the moisture removal device 35 to the stack 400. That is, at least that portion of the pipe 301 is disposed such that, of two arbitrary points having different phases in the longitudinal direction (in particular, two arbitrary points located on a bottom portion of the pipe 301), the point on the side close to the terminating end 301A is always on the upper side, or positioned at substantially the same height in the gravitational direction as, the point on the side close to moisture removal device 35.

The water recovery tank 126 disposed below the reformer 30. That is, the water recovery tank 126 is disposed such that the upper end of the inner surface of that container is always lower in the gravitational direction than the bottom surface of the inside of the reformer 30.

Further, the condensers 142 and 144 are both disposed below the stack 400. Also, the pipes 401 and 402 which connect the condensers 142 and 144, respectively, with the stack 400 are disposed so as to always be downward paths from the stack 400 to the condensers 142 and 144. That is, the pipes 401 and 402 are disposed such that, of two arbitrary points having different phases in the longitudinal direction (in particular, two arbitrary points located on a bottom portion of the pipes 401 and 402), the point on the side close to terminating ends 401A and 402A is always on the lower side, or positioned at substantially the same height in the gravitational direction as, the point on the side close to starting ends 401B and 402B.

According to the second exemplary embodiment as described above, the reformer 30 is disposed below the stack 400, and the pipe 301 which connects the reformer 30 with the stack 400 is disposed so as to always be an upward path from the reformer 30 to the stack 400. Accordingly, with the second exemplary embodiment, it is possible to restrict entry of the condensed water from the reformer 30 into the fuel cell cells 410 of the stack 400. As a result, it is possible to prevent the pipe 301, which serves as the path for the fuel gas, from becoming blocked off.

Also according to the second exemplary embodiment, the water recovery tank 126 is disposed below the reformer 30, which enables entry of the condensed water from the water recovery tank 126 into the reformer 30 to be restricted. More particularly, it is possible to avoid a situation in which excess water is supplied to the reformer 30 when the water recovery tank 126 leaks or fails. Also according to the second exemplary embodiment, the reformer 30 is disposed below the stack 400, and the water recovery tank 126 is disposed below the reformer 30. As a result, the water recovery tank is below the stack 400 such that condensed water from the water recovery tank 126 is restricted from entering the fuel cell cell 410 of the stack 400.

According to the second exemplary embodiment, the upper end of the inner surface of the reformer 30 is always lower than the bottom surface of the inside of the stack 400. Further, according to the second exemplary embodiment, the upper end of the inside surface of the container of the water recovery tank 126 is always lower than the bottom surface of the inside of the reformer 30. However, with this invention, the water recovery tank 126 may be disposed anywhere as long as the presumed surface of the water stored in the water recovery tank 126 is always at a lower height than the bottom surface of the inside of the reformer 30, and the desired effect is still able to be obtained to a respectable degree for this invention. In the same way, according to the second exemplary embodiment, the upper end of the inside surface of the container of the moisture removal device 35 is always lower than the bottom surface of the inside of the stack 400. However, with this invention, the moisture removal device 35 may be disposed anywhere as long as the presumed surface of the water stored in the container of the moisture removal device 35 is always at a lower height than the bottom surface of the inside of the stack 400, and the desired effect is still able to be obtained to a respectable degree for this invention.

Further, according to the second exemplary embodiment, the condensers 142 and 144 are both disposed below the stack 400. As a result, it is possible to restrict entry of the condensed water from the condensers 142 and 144 into the fuel cell cells 410 of the stack 400. According to the second exemplary embodiment, the upper ends of the inside surfaces of the respective containers of the condensers 142 and 144 are always lower than the bottom surface of the inside of the stack 400. However, with this invention, the moisture removal device 35 may be disposed anywhere as long as the presumed surface of the water stored in the respective containers of the condensers 142 and 144 is always at a lower height than the bottom surface of the inside of the stack 400, and the desired effect is still able to be obtained to a respectable degree for this invention. Also according to this exemplary embodiment, both of the condensers 142 and 144 are disposed below the stack 400. Alternatively, however, only one of the condensers 142 and 144 may be disposed below the stack 400 and the desired effect is still able to be obtained to a respectable degree for this invention.

Third Embodiment

Next, a third exemplary embodiment will be described. The third exemplary embodiment differs from the second exemplary embodiment only in that the position of the members is different and some of the members are replaced with other members. Those members in the third exemplary embodiment that are substantially the same as the members in the second exemplary embodiment shall be denoted by like reference numerals, and descriptions of those members shall be omitted.

Referring to FIG. 6, the reformer 30 is disposed to the side of the stack 400. Communication is provided between the reformer 30 and a moisture removal device 135 by a pipe 302. Midway in the pipe 302 at a point close to the moisture removal device 135, a pipe 361 branches off from the pipe 302 so as to provide communication with the stack 400. The moisture removal device 135 is structured substantially similar to the moisture removal device 35 in the second exemplary embodiment.

The pipe 302 is disposed so as to always be a downward path from the reformer 30 to the moisture removal device 135. That is, the pipe 302 is disposed such that, of two arbitrary points having different phases in the longitudinal direction (in particular, two arbitrary points located on a bottom portion of the pipe 301), the point on the side close to a terminating end 302A is always on the lower side, or positioned at substantially the same height in the gravitational direction as, the point on the side close to a starting end 302B. The pipe 361 extends horizontally from the moisture removal device 135 to the stack 400.

Meanwhile, a S-shaped trap pipe 133 is connected to an outflow path for water in a liquid phase from the condenser 142. This S-shaped trap pipe 133 extends downward from the condenser 142 until a downward U-shaped bend portion, then extends upward from that portion until an inverted U-shaped bend portion, and then extends downward again to the water recovery tank 126. Water in a liquid phase collects in the U-shaped downward bend portion such that the U-shaped downward bend portion becomes the boundary between the condenser 142 side and the water recovery tank 126 side, thereby effectively providing a seal therebetween (i.e., blocking the fuel gas from flowing out from the condenser 142 to the water recovery tank 126 by the water in a liquid phase).

According to the third exemplary embodiment as described above, the pipe 302 that connects the reformer 30 with the moisture removal device 135 is always a downward path from the reformer 30 to the moisture removal device 135, and the moisture removal device 135 is provided near the stack 400. Therefore, entry of the condensed water from the reformer 30 into the fuel cell cells 410 of the stack 400 is able to be restricted, thus preventing the pipe 302, which serves as the path for the fuel gas, from being blocked off. Moreover, the S-shaped trap pipe 133 is connected to the discharge side of the condenser 142. As a result, the fuel gas is able to be blocked off and the construction can be made simple.

According to the third exemplary embodiment, the pipe 361, which extends to the stack 400 from midway between the moisture removal device 135 and the stack 400, is horizontal. Alternatively, however, the pipe 361 may also be disposed so as to always be an upward path from the moisture removal device 135 side to the stack 400 side. That is, the pipe 361 may be disposed such that, of two arbitrary points having different phases in the longitudinal direction (in particular, two arbitrary points located on a bottom portion of the pipe 361), the point on the side close to the stack 400 is always on the upper side in the gravitational direction with respect to the point on the side close to the moisture removal device 135. Also, the pipe 361 may also be such that a portion thereof may be an upward path toward the stack 400 side and the other portion may be horizontal. The longer the upward portion is with respect to the horizontal portion, the better entry of the water into the stack 400 is able to be restricted.

While the invention has been described with reference to preferred embodiments thereof, it is to be understood that the invention is not limited to the preferred embodiments or constructions. To the contrary, the invention is intended to cover various modifications and equivalent arrangements. In addition, while the various elements of the preferred embodiments are shown in various combinations and configurations, which are exemplary, other combinations and configurations, including more, less or only a single element, are also within the spirit and scope of the invention.

What is claimed is:

1. A fuel cell power generation system comprising:
    a fuel cell that generates power by an electrochemical reaction with a supply of a fuel gas and an oxide gas;
    an electronic control unit that controls a plurality of valves and an amount of power generated by the fuel cell; and
    a reformer in which a temperature thereof is hot while the system is operating,
    wherein the fuel cell, electronic control unit and the reformer are disposed separated from each other in a single enclosure, and
    wherein the electronic control unit is disposed at a side opposite a side on which the reformer is disposed and the fuel cell, the electronic control unit, and the reformer are housed in the same enclosure, the fuel cell being disposed above the reformer so that heat from the reformer can be transmitted to the fuel cell to warm the fuel cell up.

2. The fuel cell power generation system according to claim 1, wherein the fuel cell is disposed above the electronic control unit, a pipe connecting portion for gas and coolant pipes is provided at one end of the fuel cell, and a power output portion is provided at the other end of the fuel cell.

3. The fuel cell power generation system according to claim 1, wherein the reformer includes a fuel gas generating portion that supplies a hydrogen rich gas obtained by a reaction between a hydrocarbon fuel and water, as a fuel gas, to the fuel cell.

4. The fuel cell power generation system according to claim 3, wherein the reformer includes an off gas combusting portion that combusts at least one of a fuel gas that did not pass through the fuel cell at startup of the system and a fuel gas that was not consumed by the fuel cell during operation of the system.

5. The fuel cell power generation system according to claim 1, wherein the reformer includes an off gas combusting portion that combusts at least one of a fuel gas that did not pass through the fuel cell at startup of the system and a fuel gas that was not consumed by the fuel cell during operation of the system.

6. The fuel cell power generation system according to claim 1, further comprising:
    a low temperature portion which is disposed between the electronic control unit and the reformer, and which has a low temperature while the system is operating.

7. The fuel cell power generation system according to claim 6, wherein the low temperature portion is disposed near the electronic control unit.

8. The fuel cell power generation system according to claim 6, wherein the low temperature portion includes at least one of an anode off gas heat exchanger that removes heat from an anode off gas discharged from an anode of the fuel cell, a cathode off gas heat exchanger that removes heat from a cathode off gas discharged from a cathode of the fuel cell, and a heat exchanger that removes heat from a coolant that cools the fuel cell.

9. The fuel cell power generation system according to claim 6, wherein the low temperature portion includes a water tank that stores water necessary for operating the system.

10. A fuel cell power generation system of claim 1, wherein the fuel cell is stationary.

11. The fuel cell power generation system according to claim 1, the fuel cell is a polymer electrolyte membrane fuel cell.

12. The fuel cell power generation system according to claim 1,
    heat insulating materials are not provided between the electronic control unit and the reformer in the single enclosure.

13. The fuel cell power generation system according to claim 1, the reformer being spaced from one another within the single enclosure.

14. The fuel cell power generation system according to claim 1, the fuel cell and the reformer being spaced from one another within the single enclosure.

15. The fuel cell power generation system according to claim 1, a plurality of fuel cell cells of the fuel cell comprise a stack and are vertically disposed.

* * * * *

UNITED STATES PATENT AND TRADEMARK OFFICE
CERTIFICATE OF CORRECTION

PATENT NO. : 7,494,731 B2
APPLICATION NO. : 10/326140
DATED : February 24, 2009
INVENTOR(S) : Nobuki Hattori et al.

Page 1 of 1

It is certified that error appears in the above-identified patent and that said Letters Patent is hereby corrected as shown below:

| Column | Line | |
|---|---|---|
| 9 | 57 | After "such" insert --as--. |
| 11 | 5 | Before "electrons" delete "a". |
| 12 | 8 | After "in" delete "the". |
| 16 | 30 | Change "A fuel cell" to --The fuel cell--. |
| 16 | 33 | After "claim 1," insert --wherein--. |
| 16 | 36 | After "claim 1," insert --wherein--. |
| 16 | 47 | After "claim 1," insert --wherein--. |

Signed and Sealed this

Eighteenth Day of August, 2009

David J. Kappos
*Director of the United States Patent and Trademark Office*